G. G. McCORMICK.
CLOTHES DRAINING BASKET.
APPLICATION FILED SEPT. 4, 1917.

1,382,521.

Patented June 21, 1921.

Witness

Inventor
George G. McCormick

UNITED STATES PATENT OFFICE.

GEORGE G. McCORMICK, OF COLLINSVILLE, ILLINOIS.

CLOTHES-DRAINING BASKET.

1,382,521.  Specification of Letters Patent.  Patented June 21, 1921.

Application filed September 4, 1917. Serial No. 189,555.

*To all whom it may concern:*

Be it known that I, GEORGE G. MCCORMICK, a citizen of the United States of America, and a resident of Collinsville, in the county of Madison and State of Illinois, have invented certain new and useful Improvements in Clothes-Draining Baskets, of which the following is a specification.

The primary object of this invention is in providing an improved lifting and draining basket for clothes and the like, in which the handles thereof are more adaptable relative to elevating and lowering the basket in a boiler, and for suspending the basket from the top edge of the boiler.

Figure 1:
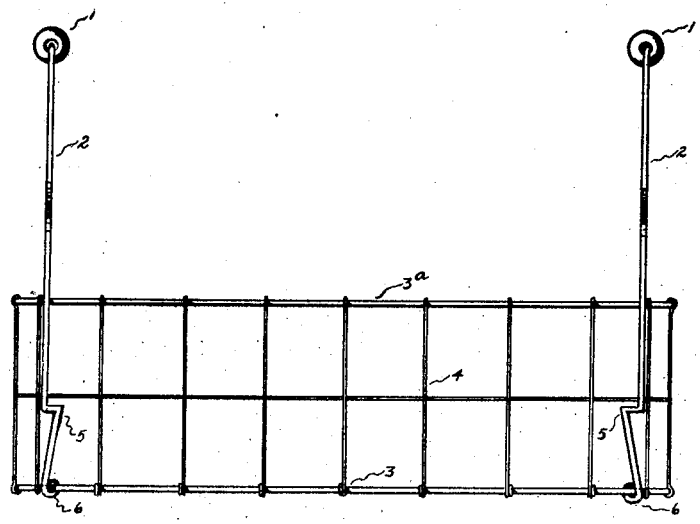

Other and further objects will appear in the specification and be specifically pointed out in the appended claim, reference being had to the accompanying drawings exemplifying the invention, and in which, Figure 1 is a side elevation of this improved basket.

Figure 2:
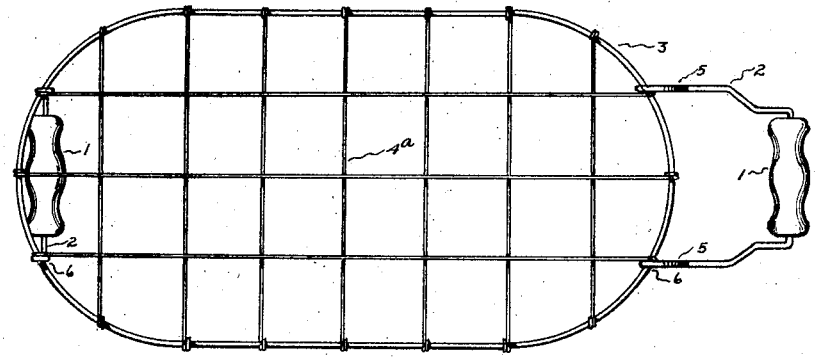

Fig. 2 is a top view of Fig. 1 showing one of the handles in a moved position.

Referring to the drawings, this improved basket is preferably constructed of wire, in which the side wall 4 is constructed of an open weave material, said side wall being secured at its lower end to an endless base wire 3, and at its upper end to an endless top wire 3ª. Supported by the base wire 3 is an open weave bottom 4ª.

Arranged adjacent each end of the basket is an inverted U-shaped lifting handle 2, each of the depending ends of said handles being swingingly secured as designated at 6 to the base wire 3, each of said depending ends of said handles having an inwardly bent portion forming hooks 5 which are adapted to extend through the open weave of the side wall 4 of the basket.

In using this improved basket when lowering and lifting it to or from a wash boiler, especially if the basket is filled with wet clothes, the operator will have a natural tendency to hold the handles inwardly against the basket, and in vertical positions when the hand grips 1 of the handles are engaged (see Fig. 1), which position of the handles will hold the hooks 5 thereof within the confines of the side wall of the basket, said hooks thereby being out of engagement with the top edge of the boiler, as the basket is being lowered therein.

When it is desired to hold the backet in a suspended position above the boiler when the basket has been raised the proper height, the handles are moved outwardly, thereby engaging the hooks 5 thereof over the top edge of the boiler.

In emptying the clothes from the basket into a tub or the like when the basket is being turned toward an inverted position, the handles can be swung away from the ends of the basket to approximately meeting positions over the bottom of the basket so that the hand grips 1 thereof will come together and can be engaged by one hand of the operator while the other hand of the operator can be used for disengaging clothes that may cling inside of the basket.

What I claim is:

A draining basket comprised of open weave material having inverted U-shaped lifting handles swingingly secured adjacent each end at the bottom of the basket, the depending ends of each of said handles bearing an inwardly formed hook-shaped portion which is adapted to extend into the confines of the side wall of the basket between the upper and lower portions thereof when the handles are moved in approximately vertical positions against the outside of the basket.

GEORGE G. McCORMICK.

Witnesses:
LOGAN G. BLAKE,
J. B. PURCELL.